US009613566B2

(12) United States Patent
Wang et al.

(10) Patent No.: US 9,613,566 B2
(45) Date of Patent: Apr. 4, 2017

(54) DRIVING DEVICE AND DRIVING METHOD OF AMOLED

(71) Applicant: Shenzhen China Star Optoelectronics Technology Co., Ltd., Shenzhen, Guangdong (CN)

(72) Inventors: Zhenling Wang, Guangdong (CN); Taijiun Hwang, Guangdong (CN); Pingsheng Kuo, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 158 days.

(21) Appl. No.: 14/428,634

(22) PCT Filed: Feb. 6, 2015

(86) PCT No.: PCT/CN2015/072351

§ 371 (c)(1),
(2) Date: Mar. 16, 2015

(87) PCT Pub. No.: WO2016/070506

PCT Pub. Date: May 12, 2016

(65) Prior Publication Data

US 2016/0343296 A1 Nov. 24, 2016

(30) Foreign Application Priority Data

Nov. 4, 2014 (CN) .......................... 2014 1 0614739

(51) Int. Cl.
*G06F 3/038* (2013.01)
*G09G 3/3225* (2016.01)
*G09G 3/32* (2016.01)

(52) U.S. Cl.
CPC ............. *G09G 3/3225* (2013.01); *G09G 3/32* (2013.01); *G09G 2300/0819* (2013.01); (Continued)

(58) Field of Classification Search
CPC ......... G09G 3/3233; G09G 2300/0866; G09G 3/32; G09G 3/3225; G09G 2300/0819; (Continued)

(56) References Cited

U.S. PATENT DOCUMENTS

2011/0096061 A1* 4/2011 Lin ...................... G09G 3/3233 345/212
2016/0005356 A1* 1/2016 Zhang .................. G09G 3/3233 345/690
2016/0071458 A1* 3/2016 Tan ...................... G09G 3/3233 345/212

* cited by examiner

*Primary Examiner* — Nelson Rosario
(74) *Attorney, Agent, or Firm* — Andrew C. Cheng

(57) ABSTRACT

An AMOLED driving device includes a control module, a voltage module, and a display panel. The control module includes a timing control unit, a data output unit, a black screen output unit, and a data output selection unit. The voltage module includes a Gamma constant voltage unit and an OLED driving voltage unit. The timing control unit generates a frame control signal (Frame_ctr) that controls the data output selection unit (14) and the OLED driving voltage unit so that a normal image is output in one frame, while a black screen is output in another frame. During the period of outputting of the black screen, a preset positive potential is switched to connect to a power supply negative potential so as to prevent the occurrence of a display defect of residual image and effectively suppress threshold voltage shifting of a second transistor.

9 Claims, 5 Drawing Sheets

(52) U.S. Cl.
CPC . *G09G 2310/0254* (2013.01); *G09G 2310/08* (2013.01); *G09G 2320/0257* (2013.01); *G09G 2320/045* (2013.01)

(58) Field of Classification Search
CPC ....... G09G 2310/0254; G09G 2310/08; G09G 2320/0257; G09G 2320/045
See application file for complete search history.

DRIVING DEVICE AND DRIVING METHOD OF AMOLED

BACKGROUND OF THE INVENTION

1. Field of the Invention

The present invention relates to the field of displaying technology, and in particular to a driving device and a driving method of an active matrix organic light-emitting diode (AMOLED).

2. The Related Arts

Flat panel displays have a variety of advantages, such as thin device body, low power consumption, and being free of radiation, and are thus widely used. Currently available flat panel displays generally include liquid crystal displays (LCDs) and organic light emitting displays (OLEDs).

Organic light emitting displays (OLEDs) have a variety of superior properties, such as being self-luminous, requiring no backlighting, high contrast, reduced thickness, wide view angle, fast response, applicability to flexible panels, wide range of operation temperature, and having simple structure and manufacturing process, and are regarded as emerging technology of the next generation flat panel displays.

The OLEDs can be classified, according to the type of driving, as passive OLEDs (such as passive matrix OLEDs (PMOLEDs)) and active OLEDs (such as active matrix OLEDs (AMOLEDs)). The AMOLEDs belong to the type of active displaying and have a display panel on which pixel structures are provided in an arrangement of an array.

An AMOLED pixel structure is generally composed of two transistors in combination with a storage capacitor for storing electrical charges in order to control brightness performance of an organic light emitting diode. The organic light emitting diode is a current driving device, which generates different brightness of light according to the magnitude of electrical current flowing therethrough.

FIG. 1 is a schematic view illustrating an AMOLED pixel structure. The pixel structure comprises a driving portion and a light emitting portion, wherein the driving portion comprises a first transistor T1, a second transistor T2, and a storage capacitor CS and the light emitting portion comprises an organic light emitting diode D. The first transistor T1 has a drain electrode that receives a data signal Data, a gate electrode that receives a scan signal Scan, and a source electrode electrically connected to a gate electrode of the second transistor T2. The scan signal Scan controls the conduction of the first transistor T1. The second transistor T2 has a drain electrode electrically connected with a positive potential OVDD of a power source and a source electrode electrically connected to a positive terminal of the organic light emitting diode D. The organic light emitting diode D has a negative terminal electrically connected to a negative potential OVSS of the power source. The capacitor CS has an end electrically connected to the gate electrode of the second transistor T2 and an opposite end electrically connected to the drain electrode of the second transistor T2.

In carrying out a driving operation with a conventional AMOLED driving device, two adjacent normal frames of image are sequentially displayed. When the scan signal Scan is a low level signal, the first transistor T1 is shut down to prohibit the voltage across the two ends of the storage capacitor CS from discharging through the first transistor and theoretically, the voltage across the two ends of the storage capacitor CS can maintain unchanged, so that the second transistor T2 keeps the organic light emitting diode D continuously emitting light until the arrival of the data signal Data of the second frame. Being cycled in this way easily causes interference of the data signal displayed in the current frame by the data signal of the previous frame, resulting in a displaying defect of residual image. Further, in case that the time period within which the same image is displayed is excessively extended, shifting of the threshold voltage of the second transistor T2 may easily result.

SUMMARY OF THE INVENTION

The present invention has an object of providing an active matrix organic light-emitting diode (AMOLED) driving device, which eliminates the displaying defect of residual image and overcomes the issue of shifting of the threshold voltage of the second transistor easily occurring when the same image has been displayed for an excessively extended period of time.

The present invention also has an object of providing an AMOLED driving method, which eliminates the displaying defect of residual image and overcomes the issue of shifting of the threshold voltage of the second transistor easily occurring when the same image has been displayed for an excessively extended period of time.

To achieve the above objects, the present invention provides an active matrix organic light emitting diode (AMOLED) driving device, which comprises a control module, a voltage module, and a display panel; wherein the control module comprises a timing control unit, a data output unit, a black screen output unit, and a data output selection unit, and the voltage module comprises a Gamma constant voltage unit and an organic light emitting diode (OLED) driving voltage unit;

wherein the display panel comprises a plurality of pixel structures that are arranged in the form of an array, and each of the pixel structures comprises a first transistor, a second transistor, a storage capacitor, and an organic light emitting diode;

wherein the timing control unit generates a frame control signal that controls the data output selection unit so that when the frame control signal is a high level, the data output selection unit outputs a normal image signal to the display panel; and when the frame control signal is a low level, the data output selection unit outputs a black screen to the display panel; and when a normal image signal is output in one frame, a black screen is output in the next frame; and wherein the frame control signal generated by the timing control unit also is configured to control the OLED driving voltage unit so that the OLED driving voltage unit supplies a power supply positive potential and a power supply negative potential to the organic light emitting diode; when the frame control signal is a high level, a normal image signal is output, and the power supply negative potential is connected to a preset negative potential output from the OLED driving voltage unit; and when the frame control signal is a low level, a black screen is output, the power supply negative potential is connected to a preset positive potential output from the OLED driving voltage unit; and the preset positive potential is higher than the power supply positive potential.

An input frequency of the AMOLED driving device is 60 HZ and, an output frequency is raised to 120 HZ.

The Gamma constant voltage unit supplies voltages necessary to a scan driving circuit and a data driving circuit.

The timing control unit further generates a scan control signal and a data control signal.

The timing control unit receives a clock signal and an effective display data strobe signal from a low voltage differential signal, and the data output unit receives a normal image signal from the low voltage differential signal.

A drain electrode of the first transistor is configured to receive a data signal, a gate electrode is configured to receive a scan signal, and a source electrode is electrically connected to a gate electrode of the second transistor; a drain electrode of the second transistor is electrically connected to the power supply positive potential, and a source electrode is electrically connected to a positive terminal of the organic light emitting diode; a negative terminal of the organic light emitting diode is electrically connected to the power supply negative potential; one end of the capacitor is electrically connected to the gate electrode of the second transistor, and the other end is electrically connected to the drain electrode of the second transistor.

Data signals of two adjacent frames are alternately a normal image signal and a black screen signal.

The power supply positive potential and the power supply negative potential of two adjacent frames are of opposite phases.

The present invention also provides an AMOLED driving method, which comprises:

(1) providing a control module, a voltage module, and a display panel, and inputting a low voltage differential signal to the control module;

wherein the control module comprises a timing control unit, a data output unit, a black screen output unit, and a data output selection unit; and the voltage module comprises a Gamma constant voltage unit and an OLED driving voltage unit; and an input frequency is 60 HZ;

(2) through the low voltage differential signal input in step (1), supplying a clock signal and an effective display data strobe signal to the timing control unit and supplying a normal image signal to the data output unit;

(3) upon receiving the clock signal and the effective display data strobe signal, the timing control unit supplying a scan control signal and a data control signal to the display panel, and supplying a frame control signal to the data output selection unit and the OLED driving voltage unit; and (4) the data output selection unit alternately outputting a normal image signal and a black screen signal to the display panel according to the frame control signal received thereby; and the output frequency being raised to 120 HZ;

wherein the OLED driving voltage unit is configured to control the power supply negative potential to switchably connect to a preset negative potential and a preset positive potential according the received frame control signal; and the preset positive potential is higher than the power supply positive potential.

The present invention further provides an AMOLED driving device, which comprises a control module, a voltage module, and a display panel; wherein the control module comprises a timing control unit, a data output unit, a black screen output unit, and a data output selection unit, and the voltage module comprises a Gamma constant voltage unit and an organic light emitting diode (OLED) driving voltage unit;

wherein the display panel comprises a plurality of pixel structures that are arranged in the form of an array, and each of the pixel structures comprises a first transistor, a second transistor, a storage capacitor, and an organic light emitting diode;

wherein the timing control unit generates a frame control signal that controls the data output selection unit so that when the frame control signal is a high level, the data output selection unit outputs a normal image signal to the display panel and when the frame control signal is a low level, the data output selection unit outputs a black screen to the display panel; and when a normal image signal is output in one frame, a black screen is output in the next frame;

wherein the frame control signal generated by the timing control unit also is configured to control the OLED driving voltage unit so that the OLED driving voltage unit supplies a power supply positive potential and a power supply negative potential to the organic light emitting diode; when the frame control signal is a high level, a normal image signal is output, and the power supply negative potential is connected to a preset negative potential output from the OLED driving voltage unit; and when the frame control signal is a low level, a black screen is output, the power supply negative potential is connected to a preset positive potential output from the OLED driving voltage unit; and the preset positive potential is higher than the power supply positive potential;

wherein an input frequency of the AMOLED driving device is 60 HZ and, an output frequency is raised to 120 HZ;

wherein a drain electrode of the first transistor is configured to receive a data signal, a gate electrode is configured to receive a scan signal, and a source electrode is electrically connected to a gate electrode of the second transistor; a drain electrode of the second transistor is electrically connected to the power supply positive potential, and a source electrode is electrically connected to a positive terminal of the organic light emitting diode; a negative terminal of the organic light emitting diode is electrically connected to the power supply negative potential; one end of the capacitor is electrically connected to the gate electrode of the second transistor, and the other end is electrically connected to the drain electrode of the second transistor; and wherein data signals of two adjacent frames are alternately a normal image signal and a black screen signal.

The efficacy of the present invention is that the present invention provides a driving device and a driving method of an AMOLED, which uses a timing control unit to generate a frame control signal and uses the frame control signal to make a control such that a normal image is output in one frame, while a black screen is output in another frame, where the outputting of the black screen causes the storage capacitor of the previous frame to discharge thereby preventing the occurrence of a displaying defect of residual image; also, during the period when the black screen is output, the frame control signal controls an OLED driving voltage unit to switch and connect a preset positive potential to a power supply negative potential to make a gate electrode and a source electrode of a second transistor oppositely biased so as to effectively suppress shifting of the threshold voltage of the second transistor.

BRIEF DESCRIPTION OF THE DRAWINGS

The technical solution, as well as other beneficial advantages, of the present invention will be apparent from the following detailed description of embodiments of the present invention, with reference to the attached drawing.

In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
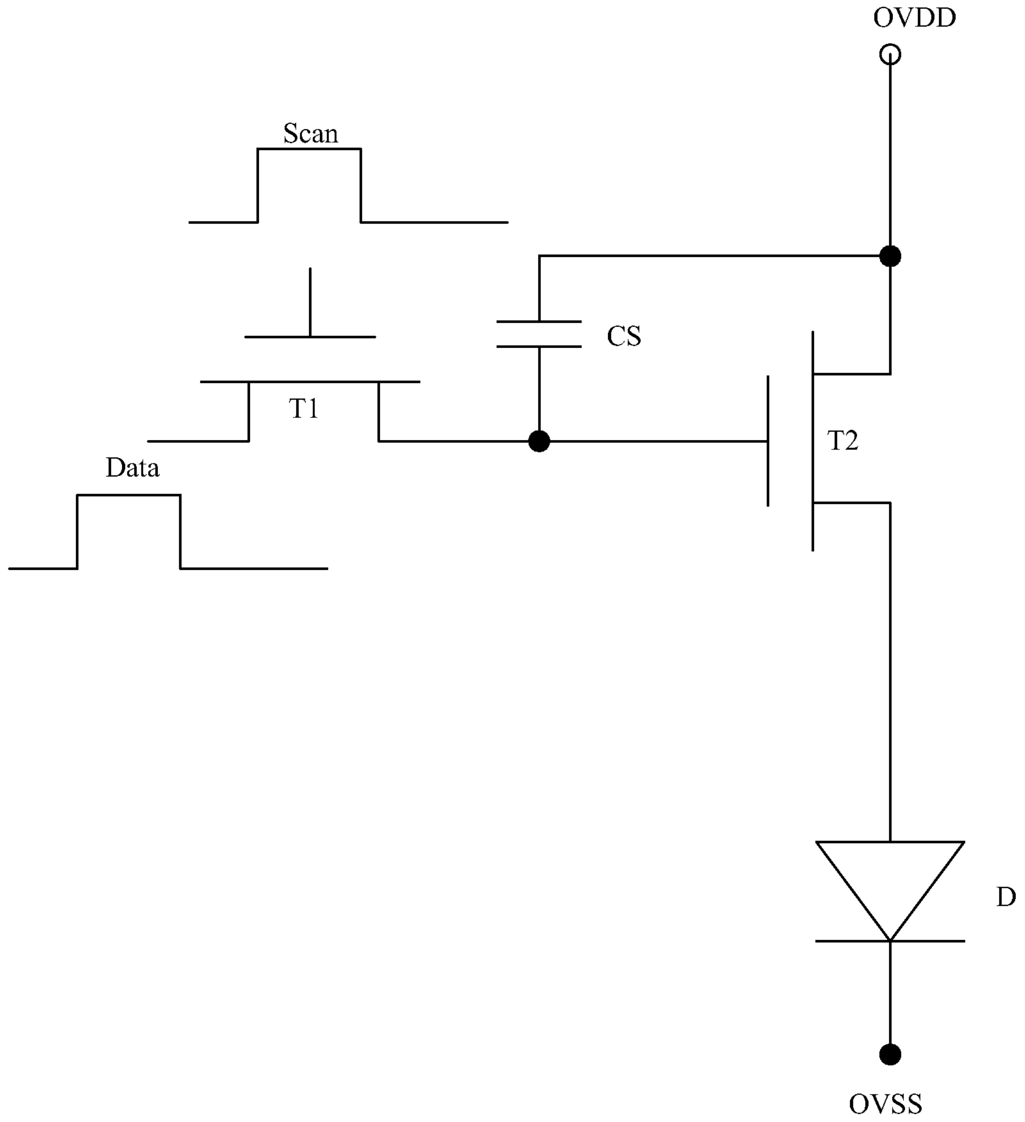
FIG. 1 is a schematic view showing the pixel structure of an active matrix organic light-emitting diode (AMOLED) backplane.
Figure 2:
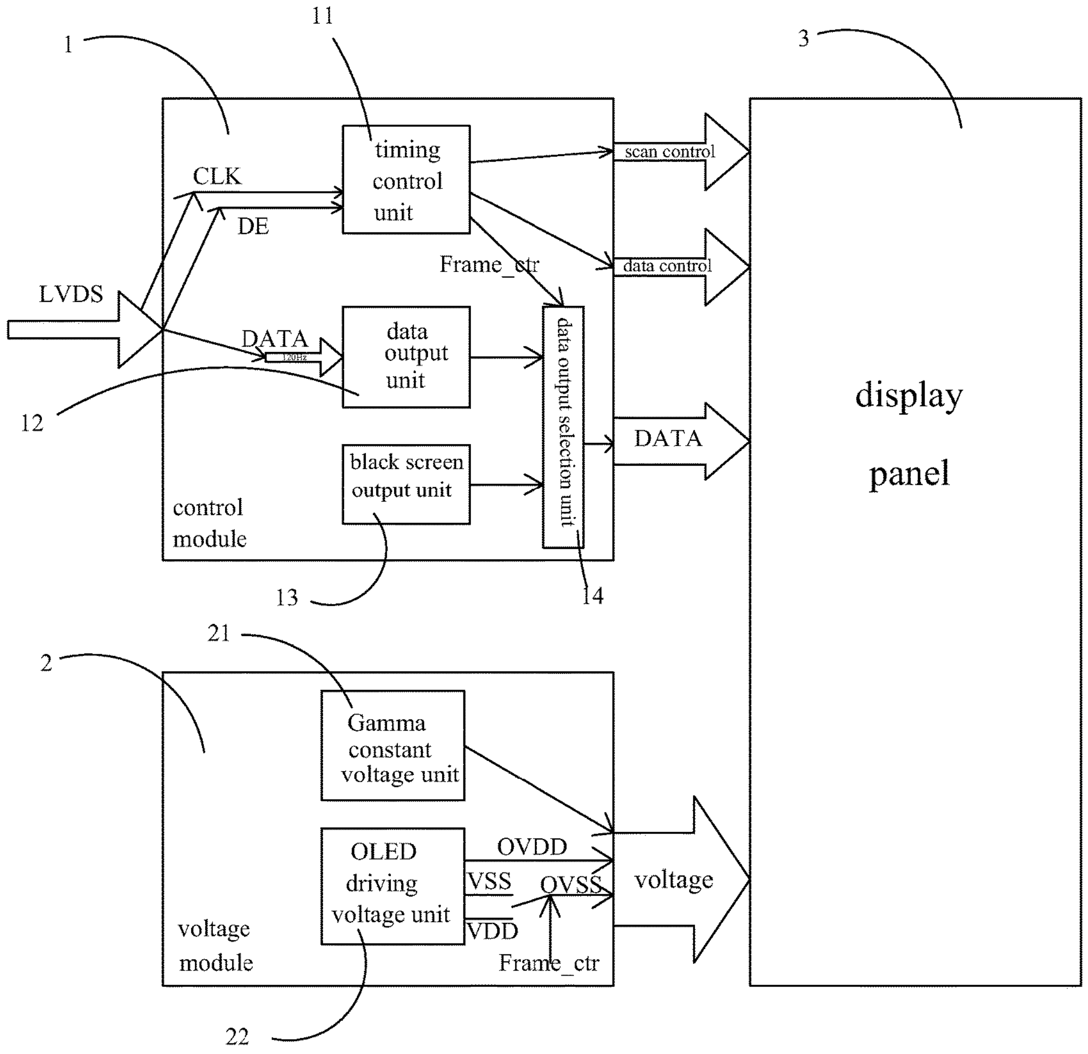
FIG. 2 is a schematic view illustrating an AMOLED driving device according to the present invention.

Referring collectively to FIGS. 1 and 2, the present invention provides an active matrix organic light emitting diode (AMOLED) driving device, which comprises a control module 1, a voltage module 2, and a display panel 3. The control module 1 comprises a timing control unit 11, a data output unit 12, a black screen output unit 13, and a data output selection unit 14. The voltage module 2 comprises a Gamma constant voltage unit 21 and an organic light emitting diode (OLED) driving voltage unit 22.

The display panel 3 comprises a plurality of pixel structures that is arranged in the form of an array, and each of the pixel structures comprises a first transistor T1, a second transistor T2, a storage capacitor CS, and an organic light emitting diode D. A drain electrode of the first transistor T1 is configured to receive a data signal Data, a gate electrode is configured to receive a scan signal Scan, and a source electrode is electrically connected to a gate electrode of the second transistor T2. The gate electrode and a drain electrode of the second transistor T2 are electrically connected to a power supply positive potential OVDD and a source electrode is electrically connected to a positive terminal of the organic light emitting diode D. A negative terminal of the organic light emitting diode D is electrically connected to a power supply negative potential OVSS. One end of the capacitor CS is electrically connected to the gate electrode of the second transistor T2, and the other end is electrically connected to the drain electrode of the second transistor T2.

The timing control unit 11 generates a frame control signal Frame_ctr that controls the data output selection unit 14 so that the data output selection unit 14 outputs a normal image signal DATA or a black screen to the display panel 3 according to the frame control signal Frame_ctr, whereby when a normal image signal DATA is output in one frame, a black screen is output in the next frame. Further, with reference being also had to FIG. 4, when the frame control signal Frame_ctr is a high level, the data output selection unit 14 outputs a normal image signal DATA to the display panel 3; and when the frame control signal Frame_ctr is a low level, the data output selection unit 14 outputs a black screen to the display panel 3.

The frame control signal Frame_ctr generated by the timing control unit 11 is configured to control the OLED driving voltage unit 22. Specifically, the OLED driving voltage unit 22 supplies a power supply positive potential OVDD and a power supply negative potential OVSS to the organic light emitting diode D; when the frame control signal Frame_ctr is a high level, a normal image signal DATA is output, and the power supply negative potential OVSS is connected to a preset negative potential VSS output from the OLED driving voltage unit 22; and when the frame control signal Frame_ctr is a low level, a black screen is output, the power supply negative potential OVSS is connected to a preset positive potential VDD output from the OLED driving voltage unit 22. The preset positive potential VDD is higher than the power supply positive potential OVDD.

Further, to achieve a normal image signal DATA supplied in one frame and a black screen supplied in the next frame, meaning normal images and black screens are supplied alternately, so as to achieve an effect of black insertion, input frequency of the AMOLED driving device is set to 60 HZ, while output frequency is raised to 120 HZ, whereby a black insertion frame is not perceived by human eyes. Through the insertion of a black screen, the outputting of the black screen causes the storage capacitor CS of the previous frame to discharge so as to overcome the issue that the data signal of the current frame is interfered with by the data signal of the previous frame.

Also, during the period when the black screen is output, the frame control signal Frame_ctr controls the OLED driving voltage unit 22 to switch and connect the preset positive potential VDD to the power supply negative potential OVSS to make the gate electrode and the source electrode of the second transistor T2 oppositely biased so as to effectively suppress shifting of the threshold voltage of the second transistor T2.

Figure 3:
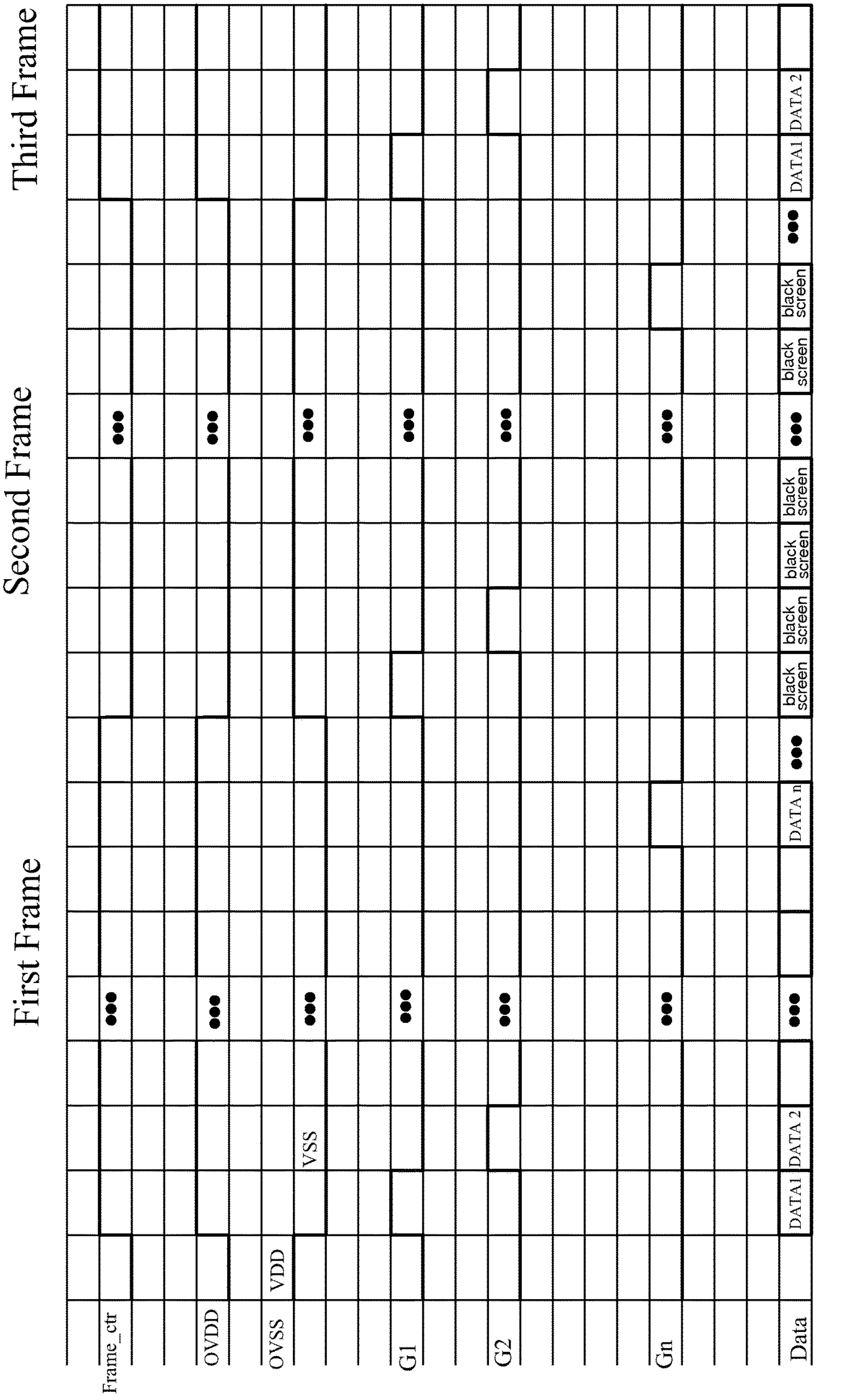
FIG. 3 is a signal waveform diagram of the AMOLED driving device according to the present invention.

Referring to FIG. 3, the power supply positive potential OVDD and the power supply negative potential OVSS of two adjacent frames are of opposite phases. In other words, when a normal image signal DATA is output, the power supply positive potential OVDD is higher than the power supply negative potential OVSS and when a black screen is output, the power supply positive potential OVDD is lower than the power supply negative potential OVSS, so as to achieve opposite biasing of the gate electrode and the source electrode of the second transistor T2 during the period when a black screen is output thereby suppressing threshold voltage shifting of the second transistor T2.

Figure 4:
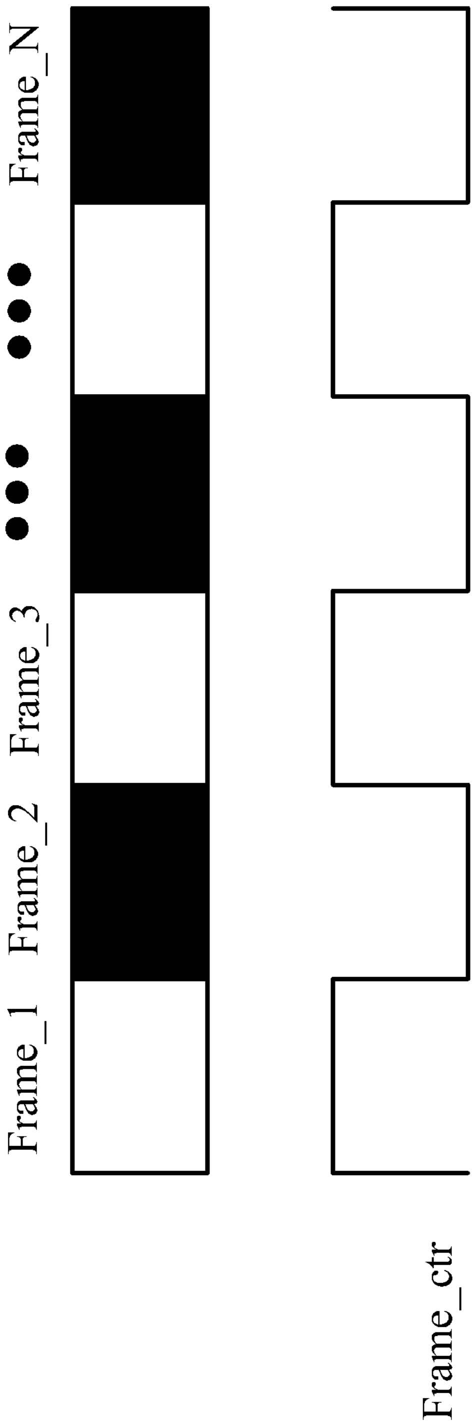
FIG. 4 is a schematic view illustrating frames of image of the AMOLED driving device according to the present invention.

Referring to FIG. 4, Data signals of two adjacent frames are alternately a normal image signal and a black screen signal so that the purpose of black insertion can be achieved on the basis of not changing the original 2T1C configuration of the pixel structures through control provided by the frame control signal Frame_ctr thereby overcoming the issue that the data signal of the currently frame is affected by the data signal of the previous frame and thus eliminating the occurrence of a displaying defect of residual image.

Finally, the Gamma constant voltage unit 21 provides voltages necessary for a scan driving circuit and a data driving circuit. The timing control unit 11 also generates a scan control signal and a data control signal. The timing control unit 11 receives a clock signal CLK and an effective display data strobe signal DE supplied from a low voltage differential signal LVDS. The data output unit 12 receives a normal image signal DATA supplied from the low voltage differential signal LVDS.

Figure 5:
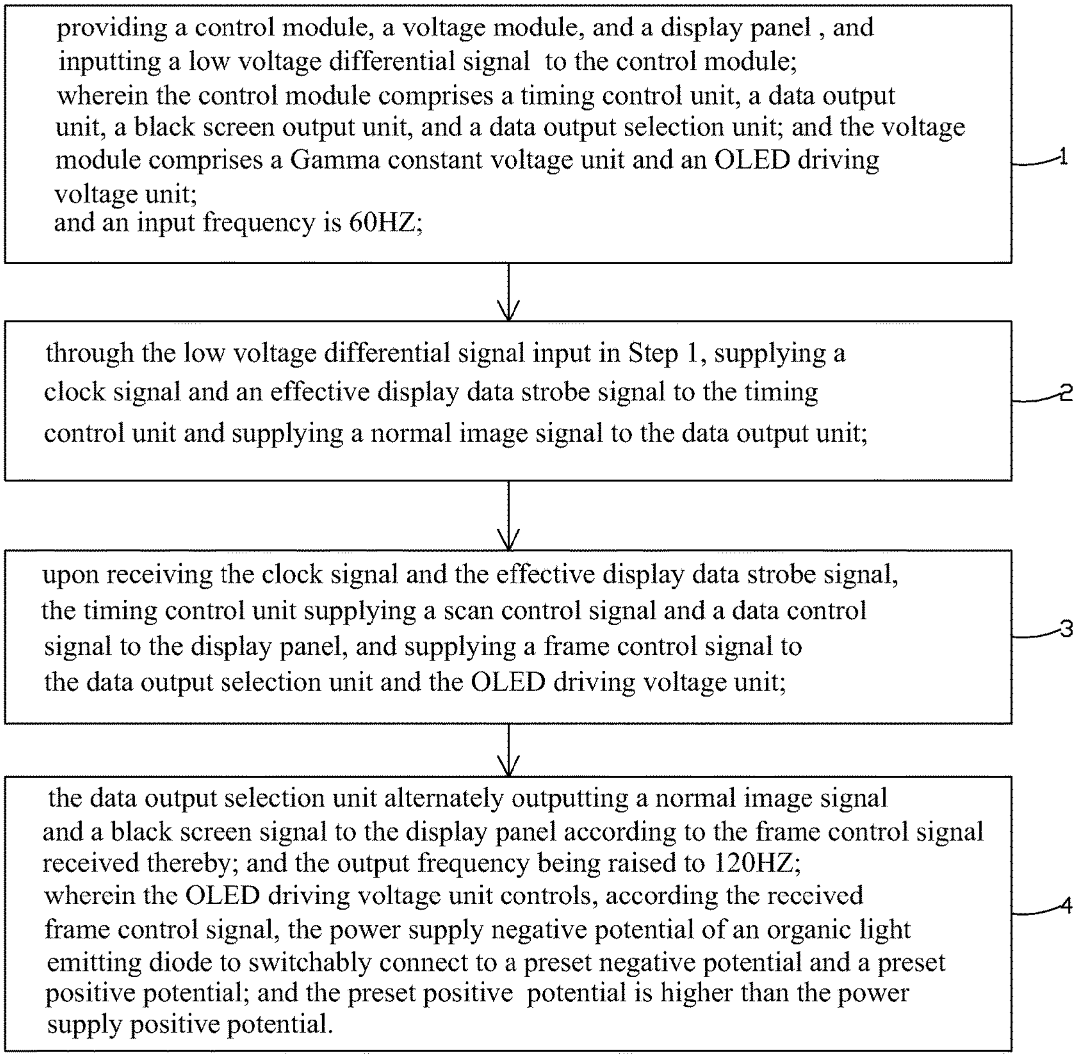
FIG. 5 is a flow chart illustrating an AMOLED driving method according to the present invention.

Referring to FIG. 5, in combination with FIGS. 1-4, the present invention also provides an AMOLED driving method, which comprises the following steps:

Step 1: providing a control module 1, a voltage module 2, and a display panel 3, and inputting a low voltage differential signal LVDS to the control module 1;

wherein the control module 1 comprises a timing control unit 11, a data output unit 12, a black screen output unit 13, and a data output selection unit 14; and the voltage module 2 comprises a Gamma constant voltage unit 21 and an OLED driving voltage unit 22; and an input frequency is 60 HZ;

Step 2: through the low voltage differential signal LVDS input in Step 1, supplying a clock signal CLK and an effective display data strobe signal DE to the timing control unit 11 and supplying a normal image signal DATA to the data output unit 12;

Step 3: upon receiving the clock signal CLK and the effective display data strobe signal DE, the timing control unit 11 supplying a scan control signal and a data control signal to the display panel 3, and supplying a frame control signal Frame_ctr to the data output selection unit 14 and the OLED driving voltage unit 22; and Step 4: the data output selection unit 14 alternately outputting a normal image signal DATA and a black screen signal to the display panel 3 according to the frame control signal Frame_ctr received thereby; and the output frequency being raised to 120 HZ;

wherein the OLED driving voltage unit 22 is configured to control the power supply negative potential OVSS to switchably connect to a preset negative potential VSS and a preset positive potential VDD according the received frame control signal Frame_ctr; and the preset positive potential VDD is higher than the power supply positive potential OVDD.

The AMOLED driving method is operated such that the data output unit 12 and the black screen output unit 13 respectively supply a normal image signal DATA and a black screen signal to the data output selection unit 14 and the data output selection unit 14 alternately supplies the normal image signal DATA and the black screen signal to the display panel 3 according to different frame control signals Frame_ctr received thereby so that black insertion can be achieved by raising the output frequency on the basis of not changing the pixel structures; and through the insertion of a black screen, the outputting of the black screen causes the storage capacitor CS of the previous frame to discharge in order to overcome the issue that the data signal displaying the current frame is affected by the data signal of the previous frame and thus eliminate the occurrence of a displaying defect of residual image. Also, during the period when the black screen is output, the frame control signal Frame_ctr controls the OLED driving voltage unit 22 to switch and connect the preset positive potential VDD to the power supply negative potential OVSS to make the gate electrode and the source electrode of the second transistor T2 oppositely biased so as to effectively suppress shifting of the threshold voltage of the second transistor T2.

In summary, the present invention provides a driving device and a driving method of an AMOLED, which uses a timing control unit to generate a frame control signal and uses the frame control signal to make a control such that a normal image is output in one frame, while a black screen is output in another frame, where the outputting of the black screen causes the storage capacitor of the previous frame to discharge thereby preventing the occurrence of a displaying defect of residual image; also, during the period when the black screen is output, the frame control signal controls an OLED driving voltage unit to switch and connect a preset positive potential to a power supply negative potential to make a gate electrode and a source electrode of a second transistor oppositely biased so as to effectively suppress shifting of the threshold voltage of the second transistor.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An active matrix organic light emitting diode (AMOLED) driving device, comprising: a control module, a voltage module, and a display panel, wherein the control module comprises a timing control unit, a data output unit, a black screen output unit and a data output selection unit, and the voltage module comprises a Gamma constant voltage unit and an organic light emitting diode (OLED) driving voltage unit;

wherein the display panel comprises a plurality of pixel structures that are arranged in the form of an array, and each of the pixel structures comprises a first transistor, a second transistor, a storage capacitor, and an organic light emitting diode;

wherein the timing control unit generates a frame control signal that controls the data output selection unit so that when the frame control signal is a high level, the data output selection unit outputs a normal image signal to the display panel; and when the frame control signal is a low level, the data output selection unit outputs a black screen to the display panel; and when a normal image signal is output in one frame, a black screen is output in the next frame;

wherein the frame control signal generated by the timing control unit also is configured to control the OLED driving voltage unit so that the OLED driving voltage unit supplies a power supply positive potential and a power supply negative potential to the organic light emitting diode; when the frame control signal is a high level, a normal image signal is output, and the power supply negative potential is connected to a preset negative potential output from the OLED driving voltage unit; and when the frame control signal is a low level, a black screen is output, the power supply negative potential is connected to a preset positive potential output from the OLED driving voltage unit; and the preset positive potential is higher than the power supply positive potential; and wherein the timing control unit receives a clock signal and an effective display data strobe signal from a low voltage differential signal, and the data output unit receives a normal image signal from the low voltage differential signal.

2. The AMOLED driving device as claimed in claim 1, wherein an input frequency of the AMOLED driving device is 60 HZ, and an output frequency is raised to 120 HZ.

3. The AMOLED driving device as claimed in claim 1, wherein the Gamma constant voltage unit supplies voltages necessary to a scan driving circuit and a data driving circuit.

4. The AMOLED driving device as claimed in claim 1, wherein the timing control unit further generates a scan control signal and a data control signal.

5. The AMOLED driving device as claimed in claim 1, wherein a drain electrode of the first transistor is configured to receive a data signal, a gate electrode is configured to receive a scan signal, and a source electrode is electrically connected to a gate electrode of the second transistor; a drain electrode of the second transistor is electrically connected to the power supply positive potential, and a source electrode is electrically connected to a positive terminal of the organic light emitting diode; a negative terminal of the organic light emitting diode is electrically connected to the power supply negative potential; one end of the capacitor is electrically connected to the gate electrode of the second transistor, and the other end is electrically connected to the drain electrode of the second transistor.

6. The AMOLED driving device as claimed in claim 1, wherein data signals of two adjacent frames are alternately a normal image signal and a black screen signal.

7. The AMOLED driving device as claimed in claim 1, wherein the power supply positive potential and the power supply negative potential of two adjacent frames are of opposite phases.

8. An active matrix organic light emitting diode (AMOLED) driving method, comprising:

(1) providing a control module, a voltage module, and a display panel, and inputting a low voltage differential signal to the control module;

wherein the control module comprises a timing control unit, a data output unit, a black screen output unit, and a data output selection unit; and the voltage module comprises a Gamma constant voltage unit and an OLED driving voltage unit; and an input frequency is 60 HZ;

(2) through the low voltage differential signal input in step (1), supplying a clock signal and an effective display data strobe signal to the timing control unit and supplying a normal image signal to the data output unit;

(3) upon receiving the clock signal and the effective display data strobe signal, the timing control unit supplying a scan control signal and a data control signal to the display panel, and supplying a frame control signal to the data output selection unit and the OLED driving voltage unit; and (4) the data output selection unit alternately outputting a normal image signal and a black screen signal to the display panel according to the frame control signal received thereby; and the output frequency being raised to 120 HZ;

wherein the OLED driving voltage unit is configured to control the power supply negative potential to switchably connect to a preset negative potential and a preset positive potential according the received frame control signal; and the preset positive potential is higher than the power supply positive potential.

9. An active matrix organic light emitting diode (AMOLED) driving device, comprising: a control module, a voltage module, and a display panel, wherein the control module comprises a timing control unit, a data output unit, a black screen output unit, and a data output selection unit and the voltage module comprises a Gamma constant voltage unit and an organic light emitting diode (OLED) driving voltage unit;

wherein the display panel comprises a plurality of pixel structures that are arranged in the form of an array and each of the pixel structures comprises a first transistor, a second transistor, a storage capacitor, and an organic light emitting diode;

wherein the timing control unit generates a frame control signal that controls the data output selection unit so that when the frame control signal is a high level, the data output selection unit outputs a normal image signal to the display panel and when the frame control signal is a low level, the data output selection unit outputs a black screen to the display panel; and when a normal image signal is output in one frame, a black screen is output in the next frame;

wherein the frame control signal generated by the timing control unit also is configured to control the OLED driving voltage unit so that the OLED driving voltage unit supplies a power supply positive potential and a power supply negative potential to the organic light emitting diode; when the frame control signal is a high level and a normal image signal is output, and the power supply negative potential is connected to a preset negative potential output from the OLED driving voltage unit and when the frame control signal is a low level, a black screen is output, the power supply negative potential is connected to a preset positive potential output from the OLED driving voltage unit; and the preset positive potential is higher than the power supply positive potential;

wherein an input frequency of the AMOLED driving device is 60 HZ, and an output frequency is raised to 120 HZ;

wherein a drain electrode of the first transistor is configured to receive a data signal, a gate is configured to receive a scan signal, and a source electrode is electrically connected to a gate electrode of the second transistor; a drain electrode of the second transistor is electrically connected to the power supply positive potential, and a source electrode is electrically connected to a positive terminal of the organic light emitting diode; a negative terminal of the organic light emitting diode is electrically connected to the power supply negative potential; one end of the capacitor is electrically connected to the gate electrode of the second transistor, and the other end is electrically connected to the drain electrode of the second transistor; and wherein data signals of two adjacent frames are alternately a normal image signal and a black screen signal.

* * * * *